…

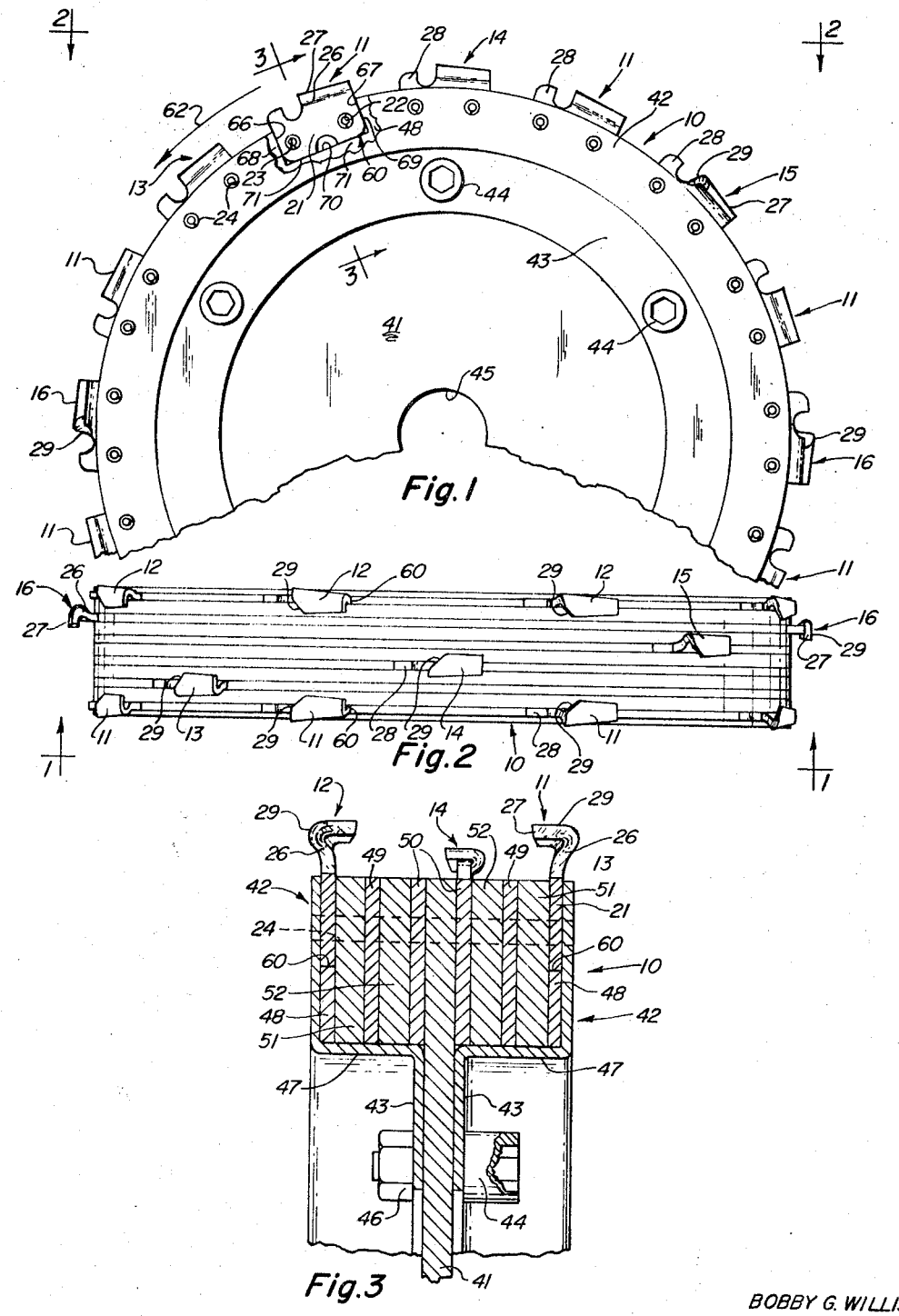

3,425,467
ROUTER TOOL WITH SAW CHAIN CUTTERS
Bobby G. Willis, Eugene, Oreg., assignor to Willis-Way
Corp., Portland, Oreg., a corporation of Oregon
Filed Jan. 11, 1965, Ser. No. 424,548
U.S. Cl. 144—218                                                9 Claims
Int. Cl. B27b 9/00; B23d 45/10

ABSTRACT OF THE DISCLOSURE

A plurality of allochiral, hooded teeth 11 and 12 are mounted in recesses in a laminated rotor and held therein by roll pins 24. The rotor has a center disc 41, recessed mounting rings 48–50 and cupped outer retaining rings 42 all of steel and also has aluminum spacing rings 51 and 52. Inner flanges of the retaining rings 42 are bolted to the center disc 41 to secure the elements together.

---

This invention relates to a router tool with saw chain cutters, and more particularly to a router disc carrying saw chain cutters spaced around the periphery thereof and also spaced across the thickness of the disc.

In wiring houses, notches are often provided in the edges of studs to receive insulated electric wires or conduits in recessed positions. The formation of such notches has been effected in the past by various tools. The use of hand saws to form such notches is, of course, quite time consuming and laborious. This also is true of portable circular saws wherein two cuts which are angled relative to each other have been necessary in the past, and the cuts are necessarily quite deep into the stud. It would be desirable to provide a tool which would cut shallower notches quickly and with a minimum of labor.

An object of the invention is to provide a router tool with saw chain cutters.

Another object of the invention is to provide a router disc carrying saw chain cutters spaced around the periphery thereof and also spaced across the thickness thereof.

A further object of the invention is to provide a laminated router disc having notches in the laminations, in which saw chain cutters are rigidly secured in positions in which the cutting edges thereof extend beyond the peripheries of the laminations.

Yet another object of the invention is to provide a router tool having saw chain cutters spaced in overlapping positions across an edge of the tool and along the tool to cut a wide kerf for receiving electrical conduits.

The invention provides a router tool having a body member provided with a wide edge, and a plurality of saw chain cutters secured to the body member in positions across the edge and with cutting portions thereof laterally overlapping each other. In a tool forming a specific embodiment of the invention a disc-like body member or rotor adapted to be mounted on the arbor of a portable circular saw includes a central disc having an arbor mounting portion, and a plurality of annular spacers and annular mounting discs are mounted on opposite sides of the central disc. The mounting plates are provided with notches into which fit saw chain cutter links of the chipper or chisel type. The annular mounting plates are separated by annular spacer plates to space the annular mounting plates laterally across the disc to mount cutters carried in close-fitting notches in the mounting plates in precise positions across the router. A pair of opposed, outer, cupped discs bracket the mounting plates and the spacers and have inner flanges abutting the central disc, to which they are secured. Roll pins extend through the plates and through holes in the bodies of the cutters to pin the cutters rigidly to the laminate. The cutters are identical except for being allochiral, and are mounted in kerf edge cutting positions and in raker positions positioned laterally between the kerf edge cutting positions. The outer cutters are mounted in opposed pairs in the kerf edge cutting positions spaced uniformly around the periphery of the rotor, and the inwardly located cutters which function as rakers are positioned around the periphery of the rotor equiangularly between the pairs of outer cutters. The cutters in the inner, raking positions are positioned in definite patterns with two outer, raker cutters positioned 180°, in the same lateral position and facing in the same general direction around the rotor, and being identical. The last-mentioned raker cutters are followed by two inner, raker cutters positioned farther inwardly but still on the same side of the rotor, positioned 180° apart from each other, which in turn are followed by two inner, raker cutters allochiral to the last-mentioned raker cutters and positioned 180° apart from each other. These latter, inner, raker cutters are followed by two outer raker cutters positioned 180° apart and being allochiral to the first-mentioned outer, raker cutters. The cutters are spaced with uniform pitch around the rotor and are located so that they may be sharpened by a file while in place on the rotor cutter, without the necessity of removing the cutters therefrom.

A complete understanding of the invention may be obtained from the following detailed description of a router tool with saw chain cutters forming a specific embodiment thereof, when read in conjunction with the appended drawings, in which:

FIG. 1 is a fragmentary face view of a router tool forming one embodiment of the invention;

FIG. 2 is a view taken substantially along line 2—2 of FIG. 2; and

FIG. 3 is an enlarged, transverse section, taken substantially along line 3—3 of FIG. 1.

Referring now in detail to the drawings, there is shown therein a laminated disc or rotor 10 which carries saw chain cutter links 11, 12, 13, 14, 15 and 16. The cutter links 11 and 12 are identical, but are allochiral, and are arranged 45° apart at the outer edges of the disc 10 in oppositely facing positions so as to cut the outer edges of a kerf in a board or stud when the router tool is mounted on an arbor of a portable circular saw (not shown) with the arbor driving the motor 10 and the router tool is brought into peripheral engagement with a board or stud to be cut. The links 13, 14, 15 and 16 are positioned midway around the rotor between the pairs of links 11 and 12 so that a uniform pitch is provided. There are two cutter links 13 mounted 180° apart in identical relationship to the outer face of the rotor 10, and these links are designated as outer rakers. There are two cutter links 14 spaced 180° apart and positioned nearer the lower edge of the rotor 10, as viewed in FIG. 2, than the upper side edge thereof. The links 14 are designated inner rakers, and face in the same direction as the outer rakers 13. There also are two identical links 15 designated inner rakers and positioned 180° apart and in the same position laterally of the rotor 10. The inner rakers 15 are allochiral to the inner rakers 14, and are spaced laterally across the rotor 10 from the inner rakers 14. Positioned behind the inner rakers 15 are the links 16, of which two are provided positioned 180° apart around the rotor and at the same outside, lateral position. The links 16 are identical to the rakers 12 and 15, and are allochiral. The links 16 are designated outer rakers.

The saw chain cutter links 11 to 16 are well konwn, commercially available saw chain cutter links of the chipper type, and includes bodies 21 having holes 22 and 23 for receiving rivets or roll pins 24, and each link also includes a laterally and outwardly projecting, rounded shank 26 and a toe 27. Each cutter link also includes a depth gauge 28. The shanks 26 and toes 27 have cutter edges 29 formed thereon which may be sharpened manually with a round file, as is well known in the saw chain art, and the links are mounted on the rotor 10 in such spaced positions that the links can be easily sharpened by such a file. The cutter links are mounted with the holes 22 and 23 lying on lines tangent to a circle concentric with the rotor with relief provided behind the outer portions of the cutting edges 29. The cutter links 11 to 16 also are formed and positioned so as to provide relief from the lateral, curved portions of the cutting edges 29, as illustrated in FIG. 2. As illustrated in FIGS. 2 and 3, the cutting edges 29 extend laterally beyond the sides of the rotor 10 so that clearance is provided for the rotor 10 to project into a notch or kerf cut by the router tool. It should be noted, too, that the cutting edges 29 of the cutter links 11 overlap the cutting edges 29 of the cutter links 13, which overlap the cutting edges 29 of the cutter links 14. Similarly, the cutting edges 29 of the cutter links 14 overlap the cutting edges 29 of the cutter links 15, which in turn overlap the cutting edges of the cutter links 16, and the cutting edges of the cutter links 16 overlap the cutting edges of the links 12. Thus the cutters 11 and 12 function to cut the extreme lateral portions of the kerf and the rakers 13 to 16 cut the laterally inward portions of the kerf.

The rotor 10 is of laminated construction and includes a center disc 41 to which cupped outer retaining rings 42 having inner flanges 43 are secured by bolts 44 and nuts 46. The disc has an arbor receiving hole 45. As illustrated in FIG. 3, the rings 42 have inner, cylindrical portions 47 fitting closely in mounting rings or plates 48, 49 and 50, and spacer rings or plates 51 and 52 are positioned between the mounting rings 48, 49 and 50, respectively. The spacer rings 51 and 52 and the disc 41 all are of the same thickness, and laterally space the cutter links in desired overlapping positions. The mounting rings 48, 49 and 50 are of the same thickness as that of each body 21 of the cutter links, and define, with notches 60 (FIG. 1), close-fitting sockets receiving the bodies 21 of the cutter links, which back up the cutter links and rigidly hold the cutter links. The cutter links are secured in sockets by the roll pins 24 which extend through the holes 22 and 23 and aligned holes 62 and 63 in the elements 41, 42 and 48 to 52. The roll pins 24 are of well known construction and are split along the entire length thereof. The roll pins are contracted as they are driven into the holes in the laminate and expand into close-fitting engagement with the holes 62 and 63 in the laminate and the holes 22 and 23 in the bodies of the cutter links, which are of the same diameter as that of the holes 62 and 63. The disc 21 and the cupped rings 42 preferably are composed of steel, and the rings 48, 49 and 50 also preferably are composed of steel, while the spacer rings 51 and 52 preferably are composed of aluminum for lightness in weight. The steel of the mounting rings 48, 49 and 50 is a hard, wear resistant material so that wear from the cutter links and deformation from the cutting operations is prevented. End walls 66 and 67 of the sockets 60 closely engage end walls 68 and 69 of the bodies 21 of each cutter link, and bottoms 70 of the sockets closely engage flat inner edges 71 of the bodies 21.

In the operation of the router tool described above, the disc 41 is mounted on the arbor of a power saw which, for the purpose of notching studs for the installation of conduits, is a conventional, portable power saw with the disc 41 being drivingly connected to the arbor thereof to rotate in the direction of arrow 62 (FIG. 1). The cutters 11 and 12 cut the laterally outer edges of the kerf when the rotating tool is brought into engagement with a board, and the rakers 13 to 16 cut out the laterally inwardly positioned portion of the kerf. As illustrated, the thickness of the tool, and correspondingly, the width of the kerf cut thereby, is great. The router tool cuts a notch of a width approximately one inch quickly with cutter links of standard saw chain construction which are commercially available on the market, the width of each cutter edge 29 laterally across the rotor 10 being approximately 3/16 inch. The six cutter links are spaced across the rotor 10 in overlapping positions so that about one inch cutting width is provided. The depth gauges 28 limit the depth of cut of each cutter link and provide for smooth operation of the saw and keep the kerf bottom and walls smooth.

While the above-described router tool is shown as having cutter links 11 to 16 of the standard, commercially available chipper saw chain construction, it is obvious that, in place thereof, chisel type links well known in the saw chain art may also be utilized. It is also obvious that other types of saw chain links may be used in place of the types of links disclosed herein. The links are spaced apart with a uniform pitch for loading purposes, and also to provide space for conveniently filing the cutting edges to sharpen them. Each cutter link may be replaced if desired merely by removing the roll pins 24 and inserting another identical cutter link in the socket formed by the notch 60 in the mounting rings 48, 49 and 50 and the spacer rings. While in the specific embodiment of the router tool shown herein, the toes 27 of the cutter links all are positioned equidistantly out from the center of the rotor 10, it will be readily apparent that by mounting the rakers farther inwardly, a convex bottom can be formed on the kerf cut by the tool and that, conversely, if the raker teeth are mounted progressively farther outwardly from the center of the rotor 10 proceeding from the sides of the rotor laterally inwardly toward the center thereof, a concave bottom of the kerf can be formed. If these shaped, kerf bottoms are desired, the spacer rings and the mounting rings holding the deeper cutting links preferably are correspondingly increased or decreased in their external diameters. Other shapes, of course, also can be provided by spacing the cutter links radially in positions desired.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In combination,
   a plurality of annular mounting plates having notches in the outer peripheries thereof,
   a plurality of annular spacer plates positioned between the mounting plates and defining sockets with the notches,
   a plurality of allochiral, oppositely disposed, hooded saw chain cutter links having body portions provided with holes therein and fitting closely in the sockets,
   the body portions and the notches being complementary in shape and such as to enable the body portions to be moved radially into and out of the notches,
   and a plurality of roll pins extending through the holes in the body portions of the links and through the plates to lock the links to the plates.

2. The combination of claim 1 wherein the rakers are positioned along lines extending diagonally from one side of the mounting means to the other side of the mounting means.

3. The combination of claim 2 wherein the cutters and rankers are provided with shank portions extending outwardly from the edge and toes extending laterally toward the longitudinal centerline of the edge.

4. In a router tool,
   a center disc having a central hole for receiving a saw arbor,
   a pair of cupped retainer plates having inner flanges detachably secured to the disc, outer flange portions and intermediate cylindrical portions joining the flanges and the flange portions and spacing the flange portions laterally outwardly from the sides of the center disc, a plurality of spacer rings fitting on the cylindrical portions and positioned between the outer flange portions and the central disc, a plurality of mounting rings having peripheral notches and fitting on the cylindrical portions and positioned between the flange portions and the spacer rings, between the spacer rings, and between the spacer rings and the central disc, a plurality of saw chain links having perforated body portions fitting into the notches, and pin means extending through the rings and the body portions.

5. The router tool of claim 4 wherein the saw chain links are provided with shank portions extending outwardly from the rings and toe portions, the saw chain links being mounted in a predetermined pattern on the periphery of the assemblage of the rings, the central disc and the retainer plates.

6. The router tool of claim 1 wherein the annular spacer plates are of lightweight metal.

7. The router tool of claim 6 wherein the mounting plates are of steel and the spacer plates are of aluminum.

8. In a cutter head, a plurality of saw chain cutter links each having a planar body having a pair of rivet holes therein and of a predetermined external shape, a shank portion and a top plate lying in a plane transverse to the body, a plurality of annular mounting plates having peripheral notches therein complementary in shape to the shape of the body for receiving the bodies by radial movement of the bodies into the notches, a plurality of annular spacer plates bracketing the mounting plates and the bodies and having holes aligned with the rivet holes, a plurality of roll pins extending through and fitting closely in the holes in the spacer plates and the holes in bodies to releasably secure the links to the plates, and means securing the plates together to form a rotor.

9. The cutter head of claim 8 wherein the top plates are positioned in diagonal rows to facilitate sharpening.

References Cited

UNITED STATES PATENTS

| | | | |
|---|---|---|---|
| 501,213 | 7/1893 | Raabe | 144—233 |
| 933,695 | 9/1909 | Cline | 144—233 |
| 2,475,892 | 7/1949 | Hasty et al. | |
| 2,832,380 | 4/1958 | Crowe | 143—135 |
| 2,958,348 | 11/1960 | Bueneman | 143—139 |
| 3,135,304 | 6/1964 | Breer et al. | 143—44 |

FOREIGN PATENTS 404,795   1/1934   Great Britain.

DONALD R. SCHRAN, *Primary Examiner.*

U.S. Cl. X.R.

143—133; 144—237